(12) United States Patent
Ahn et al.

(10) Patent No.: US 10,285,067 B2
(45) Date of Patent: May 7, 2019

(54) METHOD FOR TRANSMITTING DATA IN UNLICENSED BAND AND DEVICE USING SAME

(71) Applicant: LG ELECTRONICS INC., Seoul (KR)

(72) Inventors: Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/559,392

(22) PCT Filed: Mar. 22, 2016

(86) PCT No.: PCT/KR2016/002860
§ 371 (c)(1),
(2) Date: Sep. 18, 2017

(87) PCT Pub. No.: WO2016/153254
PCT Pub. Date: Sep. 29, 2016

(65) Prior Publication Data
US 2018/0077581 A1  Mar. 15, 2018

Related U.S. Application Data

(60) Provisional application No. 62/136,529, filed on Mar. 22, 2015.

(51) Int. Cl.
*H04W 16/14* (2009.01)
*H04W 74/08* (2009.01)
*H04W 84/12* (2009.01)

(52) U.S. Cl.
CPC .......... *H04W 16/14* (2013.01); *H04W 74/08* (2013.01); *H04W 74/0808* (2013.01); *H04W 84/12* (2013.01)

(58) Field of Classification Search
CPC ..... H04W 16/14; H04W 74/08; H04W 84/12; H04W 74/0808
See application file for complete search history.

(56) References Cited

U.S. PATENT DOCUMENTS

| 2006/0223448 | A1 | 10/2006 | Kruys |
| 2010/0208681 | A1 | 8/2010 | Elmaleh |
| 2014/0301351 | A1 | 10/2014 | Gao et al. |
| 2014/0341207 | A1* | 11/2014 | Bhushan ........... H04W 28/0289 370/350 |
| 2015/0071270 | A1 | 3/2015 | Harel et al. |

(Continued)

OTHER PUBLICATIONS

PCT International Application No. PCT/KR2016/002860, Written Opinion of the International Searching Authority dated Jun. 27, 2016, 6 pages.

*Primary Examiner* — Ajay Cattungal
(74) *Attorney, Agent, or Firm* — Lee, Hong, Degerman, Kang & Waimey (57) ABSTRACT

Provided are a method for transmitting data in an unlicensed band and a device using the same. A transmission node generates a signal to be transmitted in the unlicensed band, and performs listen before talk (LBT) according to the type of the generated signal. If a wireless medium is idle as a result of the LBT, the transmission node transmits the generated node in the unlicensed band.

14 Claims, 9 Drawing Sheets

(56) References Cited

U.S. PATENT DOCUMENTS

| | | | |
|---|---|---|---|
| 2016/0095039 A1* | 3/2016 | Valliappan | H04W 36/14 370/332 |
| 2016/0095040 A1* | 3/2016 | Valliappan | H04W 16/14 370/332 |
| 2016/0099794 A1* | 4/2016 | Chendamarai Kannan | H04B 17/345 370/329 |
| 2016/0119928 A1* | 4/2016 | Wu | H04L 5/001 370/329 |
| 2016/0127098 A1* | 5/2016 | Ng | H04L 5/0048 370/329 |
| 2016/0234706 A1* | 8/2016 | Liu | H04L 5/0048 |
| 2017/0238326 A1* | 8/2017 | Ahn | H04W 24/10 370/252 |

* cited by examiner

METHOD FOR TRANSMITTING DATA IN UNLICENSED BAND AND DEVICE USING SAME

CROSS-REFERENCE TO RELATED APPLICATIONS

This application is the National Stage filing under 35 U.S.C. 371 of International Application No. PCT/KR2016/002860, filed on Mar. 22, 2016, which claims the benefit of U.S. Provisional Application No. 62/136,529, filed on Mar. 22, 2015, the contents of which are all hereby incorporated by reference herein in its entirety.

BACKGROUND OF THE INVENTION

Field of the Invention

The present invention relates to wireless communication, and more particularly, to a method of transmitting data in an unlicensed band and a device using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method of transmitting data in an unlicensed band and a device using the same.

In an aspect, a method of transmitting data in an unlicensed band includes generating, by a transmission node, a signal to be transmitted in the unlicensed band, performing, by the transmission node, listen before talk (LBT) according to a type of the generated signal, and if a wireless medium is idle as a result of the LBT, transmitting the generated signal in the unlicensed band.

In another aspect, a device for transmitting data in an unlicensed band includes a transceiver configured to transmit and receive a radio signal, and a processor operatively coupled to the transceiver. The processor is configured to generate a signal to be transmitted in the unlicensed band, control the transceiver to perform listen before talk (LBT) according to a type of the generated signal, and control the transceiver to transmit the generated signal in the unlicensed band if a wireless medium is idle as a result of the LBT.

In an environment where various communication protocols co-exist in an unlicensed band, deteriorating data reception quality can be prevented.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
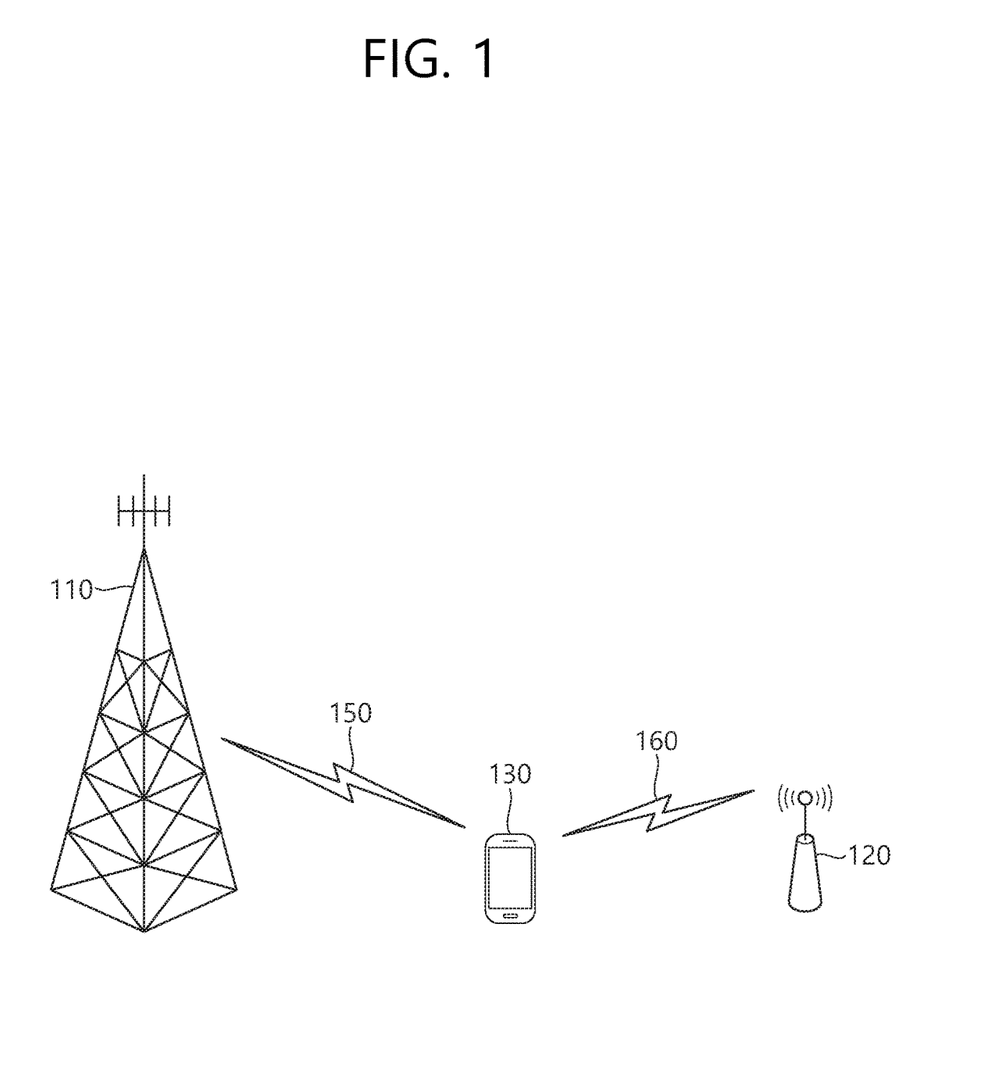
FIG. 1 shows an example of a long term evolution (LTE) service using an unlicensed band.

FIG. 1 shows an example of an LTE service using an unlicensed band.

A wireless device 130 establishes a connection with a 1st BS 110, and receives a service through a licensed band. For traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Hereinafter, a cell (or a carrier) operating in an unlicensed band is called an unlicensed cell or an unlicensed carrier. A cell operating in a licensed band is called a licensed cell or a licensed carrier.

An LBT operation in an unlicensed band is regulated in some countries. For example, in Europe, there are two types of LBT operations which are named as frame based equipment (FBE) and load based equipment (LBE).

Figure 2:
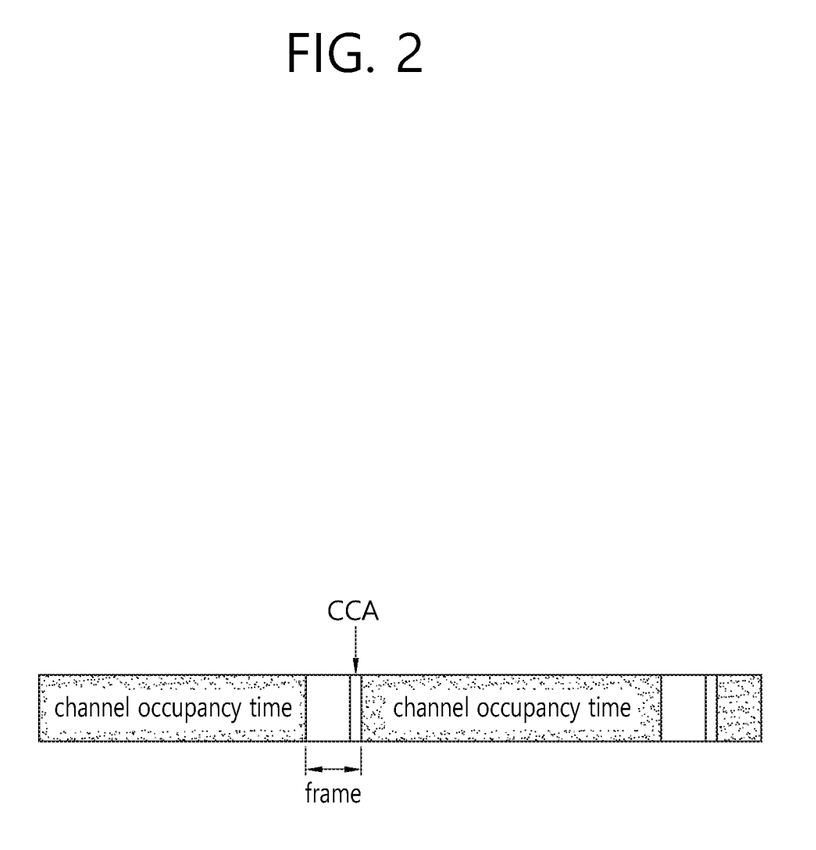
FIG. 2 shows an example of a frame based equipment (FBE)-based listen before talk (LBT) operation.

FIG. 2 shows an example of an FBE-based LBT operation.

A channel occupancy time implies a time during which transmission can be continued when a communication node successfully accesses a channel, and has a value of about 1 ms to 10 ms. A frame is an idle time corresponding to at least 5% of the channel occupancy time. CCA is defined as an operation of observing the channel during at least 20 μs before an end portion within the idle time. The communication node periodically performs the CCA in unit of the frame, and transmits data during a next channel occupancy time in a state where the channel is not occupied. The communication node defers transmission in a state where the channel is occupied, and waits until a next frame.

The FBE-based LBT operation implies that a channel occupancy time and a channel detection time are predefined, and CCA is performed only at a determined channel detection time, and may be called a fixed CCA execution method.

Figure 3:
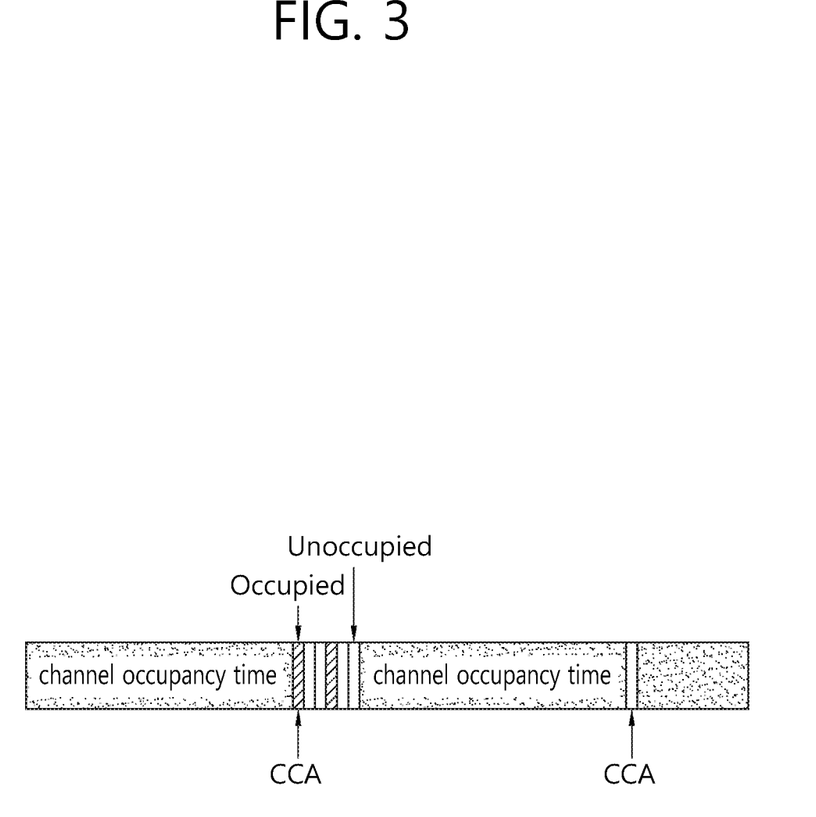
FIG. 3 shows an example of a load based equipment (LBE)-based LBT operation.

FIG. 3 shows an example of an LBE-based LBT operation.

An idle time is defined between channel occupancy times. The idle time is divided into a plurality of slots. A communication node may first set a value of $q \in \{4, 5, \ldots, 32\}$ and thereafter perform CCA for one slot, and if a channel is in an unoccupied state in the CCA slot, may transmit data by ensuring a channel occupancy time having a length of $(13/32)q$ ms. If the channel is in an occupied state in the first CCA slot, the communication node randomly chooses a value of $N \in \{1, 2, \ldots, q\}$ and stores it as an initial value of a backoff counter. Thereafter, if the channel is in the unoccupied state in one CA slot while sensing a channel state in unit of the CCA slot, a value of the backoff counter is decreased by 1. If the value of the backoff counter becomes 0, the communication node may transmit data during the channel occupancy time having the length of $(13/32)q$ ms.

The LBE-based LBT operation implies that the communication node performs the CCA by randomly determining a channel detection time (e.g., the CCA slot) according to whether the channel is occupied, and may be called a random CCA execution method.

Hereinafter, a parameter for selecting an LBT method and determining a backoff length, a parameter for determining a size of a CCA slot, and a parameter used for an LBT operation such as a period and time offset for determining CCA timing are called an LBT parameter. A unit of signals transmitted by a radio node through an LBT operation performed one time is called a transmission burst.

Hereinafter, it is proposed that a communication node performs an LBT operation by using different LBT parameters according to a channel type and/or an information type. Different types of LBT schemes may be performed according to the channel type and/or the information type.

Figure 4:
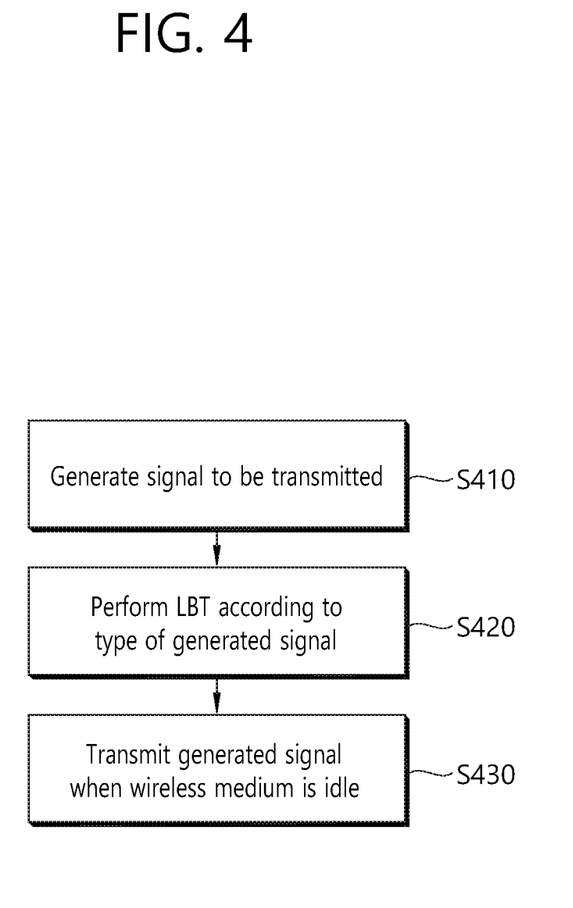
FIG. 4 shows a method of transmitting data in an unlicensed band according to an embodiment of the present invention.

FIG. 4 shows a method of transmitting data in an unlicensed band according to an embodiment of the present invention.

In step S410, a transmission node generates a signal or channel to be transmitted. In step S420, the transmission node performs LBT in the unlicensed band according to a type of the generated signal. In step S430, the transmission node transmits the generated signal when a radio medium of the unlicensed band is idle as a result of the LBT.

A physical downlink shared channel (PDSCH) of 3GPP LTE is a data channel for carrying traffic data. A discovery reference signal (DRS) is a signal periodically transmitted to measure radio resource management (RRM) of a UE. The DRS may have higher transmission importance than the PDSCH. Therefore, in order for the UE to expect DRS detection at a specific time, a fixed CCA scheme may be performed on the DRS. A random CCA scheme may be performed on the PDSCH.

The type of the signal to be transmitted may be classified variously, but there is no limitation in the number and type thereof. For example, a first type signal may be a control channel for carrying hybrid automatic repeat request (HARQ) feedback and channel state information (CSI), and a second type signal may be a data channel. Alternatively, the first type signal may be a signal sensitive to transmission delay, and the second type signal may be a signal not sensitive to transmission delay.

Different LBT schemes may be applied to the first and second type signals. For example, the fixed CCA scheme may be performed on the first type signal, and the random CCA scheme may be performed on the second type signal.

Different LBT parameters may be applied to the first and second type signals. For example, although the same random CCA scheme may be performed on the first and second type signals, the first type signal and the second type signal may have different backoff parameters or different values q. Examples of the different backoff parameters are shown below.

TABLE 1

| Signal type | CWmin | CWmax |
| --- | --- | --- |
| First type signal | 7 | 15 |
| Second type signal | 15 | 63 |

According to each signal type, the transmission node may randomly determine a value CWp satisfying CWmin<CWp<Cmax. CWp is an initial value of a backoff counter.

Although the same fixed CCA scheme is performed on the first and second type signals, the first type signal and the second type signal may have different CCA periods or different CCA slot lengths. For example, the CCA period of the first type signal may be shorter than the CCA period of the second type signal. The CCA slot length of the first type signal may be shorter than the CCA slot length of the second type signal.

Figure 5:
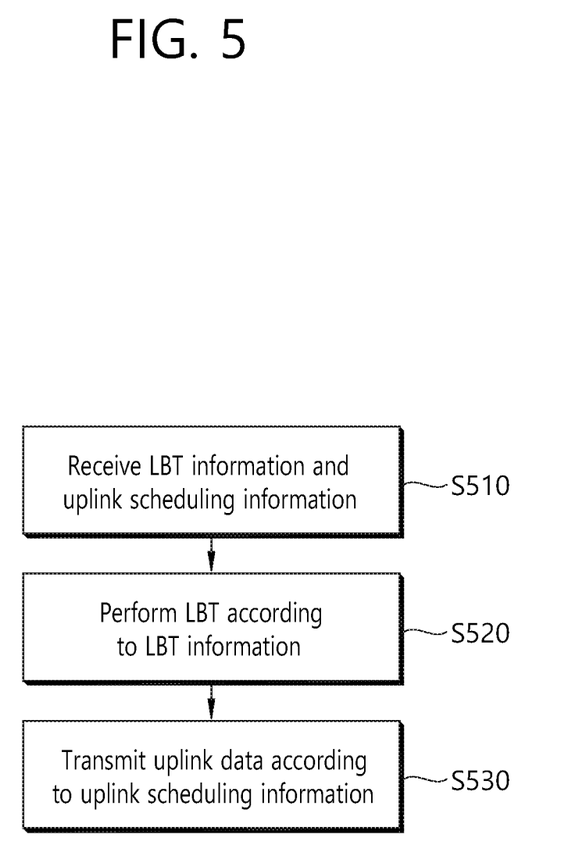
FIG. 5 shows a method of transmitting data in an unlicensed band according to another embodiment of the present invention.

FIG. 5 shows a method of transmitting data in an unlicensed band according to another embodiment of the present invention.

In step S510, a UE receives LBT information and uplink scheduling information from a BS. In step S520, the UE performs LBT according to the LBT information. In step S530, the UE transmits uplink data according to the uplink scheduling information.

The LBT information may include information regarding an LBT parameter or an LBT scheme to be performed by the UE before performing uplink transmission according to the uplink scheduling information. The LBT information may be transmitted through a physical downlink control channel (PDCCH) together with the uplink scheduling information.

The LBT information may include information regarding the LBT parameter to be applied for each time duration. For example, a fixed CCA scheme may be applied to a first radio frame, and a random CCA scheme may be applied to a second radio frame.

Meanwhile, all or some parts of different transmission bursts transmitted by a communication node through an LBT operation may overlap in a time domain. Alternatively, all or some parts of transmission bursts to which the LBT operation is not applied and transmission bursts to which the LBT operation is applied may overlap in the time domain. The following operation is proposed to transmit the overlapping bursts.

It is assumed that a transmission burst1 has a transmission length of T1, and a transmission burst2 has a transmission length of T2. It is also assumed that a maximum transmissible length of a transmission butst1 type is T1max, and a maximum transmissible length of a transmission burst2 type is T2max.

In one embodiment, a communication node selects and transmits only one transmission burst among overlapping transmission bursts. For example, when a DRS burst overlaps with a downlink (DL) burst, a BS may transmit only the DRS burst. When a burst on which uplink control information (UCI) is carried overlaps with an uplink (UL) data burst, the UE may transmit only the UCI burst.

The communication node may transmit only a burst having a longer transmission length among the overlapping bursts.

When two transmission bursts to which the LBT operation is applied overlap, the communication node may transmit only a burst of which a CCA operation is complete first to start transmission.

Figure 6:
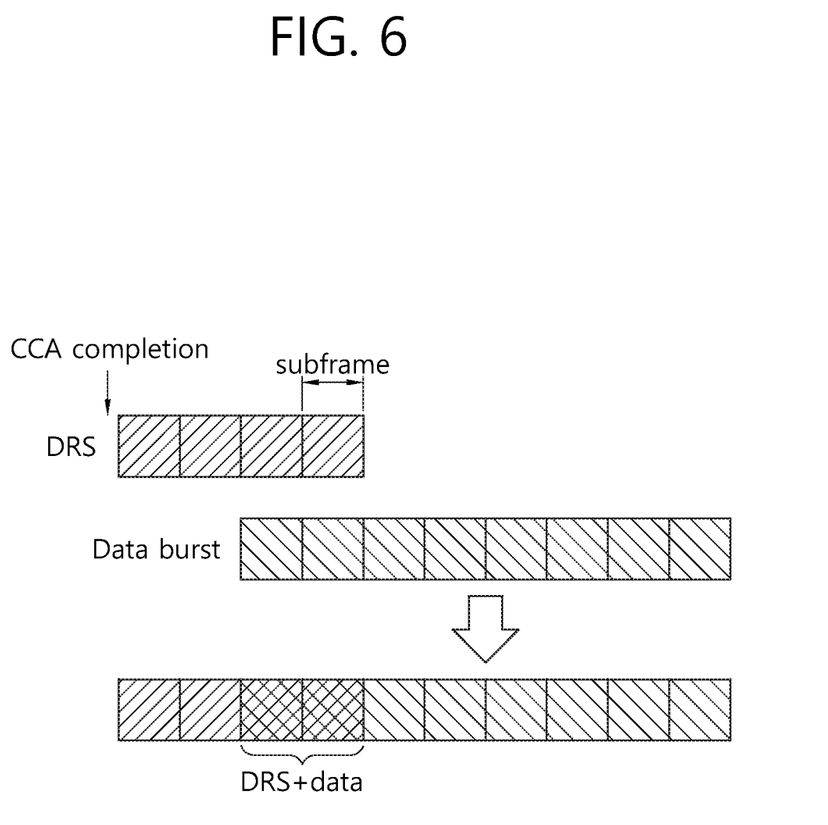
FIG. 6 shows an example of combined transmission according to an embodiment of the present invention.

FIG. 6 shows an example of combined transmission according to an embodiment of the present invention.

A communication node may combine and transmit a plurality of overlapping transmission bursts. In this case, a CCA operation for a transmission burst of which transmission starts late among the plurality of transmission bursts may be omitted.

When a DRS burst overlaps with a DL data burst, a BS may transmit only a DRS in a subframe in which the DRS is to be transmitted, and may transmit only a DL data burst in a subframe in which a DL data burst is to be transmitted.

The BS may transmit both of two signals in a subframe in which transmission of the DRS overlap with transmission of the DL data burst.

Figure 7:
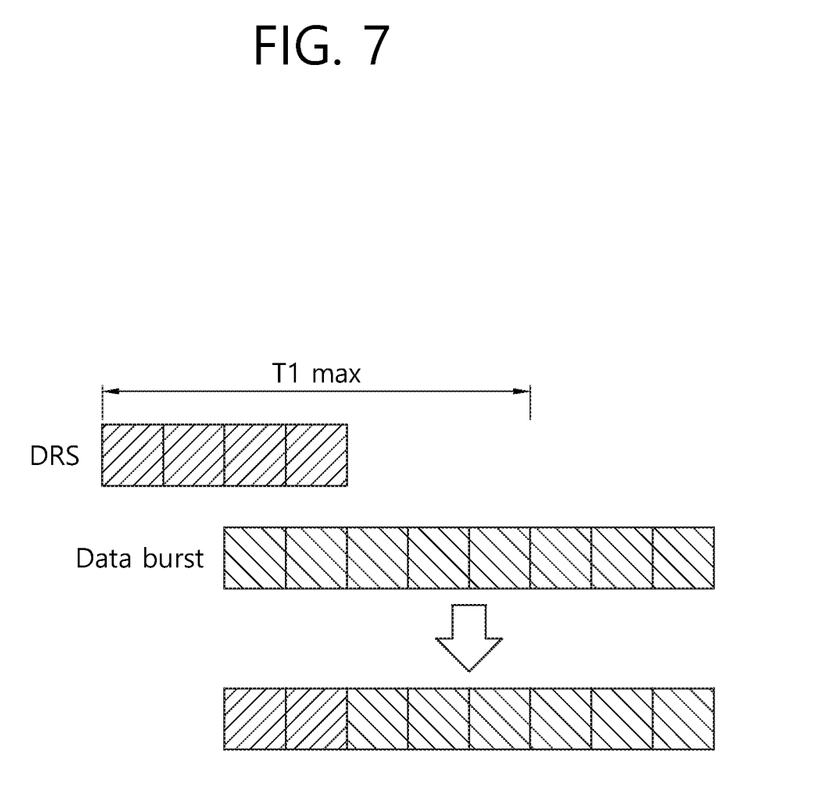
FIG. 7 and FIG. 8 show an example of transmission in an overlapping duration.
Figure 8:
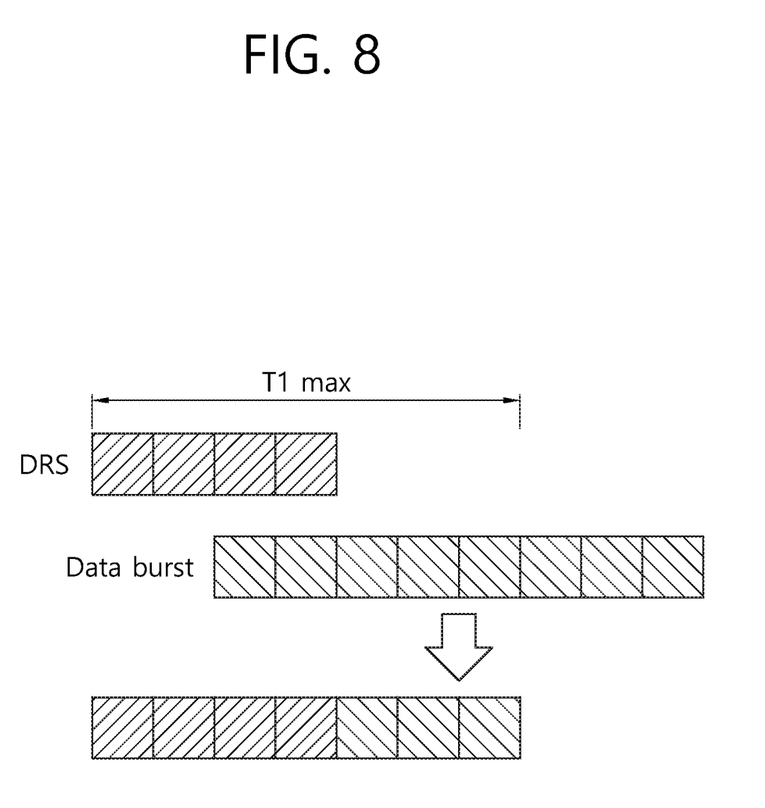

Alternatively, the BS may transmit one of two bursts in a duration in which two transmission bursts overlap. FIG. 7 and FIG. 8 show an example of transmission in an overlapping duration.

A maximum transmissible length T1max for a transmission burst (transmission burst1) of which an LBT operation is complete first may be insufficient to transmit all of a plurality of transmission bursts. FIG. 7 shows an example of discarding transmission of a preceding part of a preceding burst. That is, a plurality of transmission bursts are transmitted according to a maximum transmissible length T2max of a subsequent burst, while the preceding burst is transmitted in an overlapping duration. FIG. 8 shows an example of discarding transmission of a last part of a subsequent transmission burst. That is, a plurality of transmission bursts are transmitted according to a maximum transmissible length T1max of the preceding burst, and transmission of insufficient subsequent bursts is discarded. For another example, both of two bursts may be transmitted in the overlapping duration in the embodiment of FIG. 7 and FIG. 8.

Figure 9:
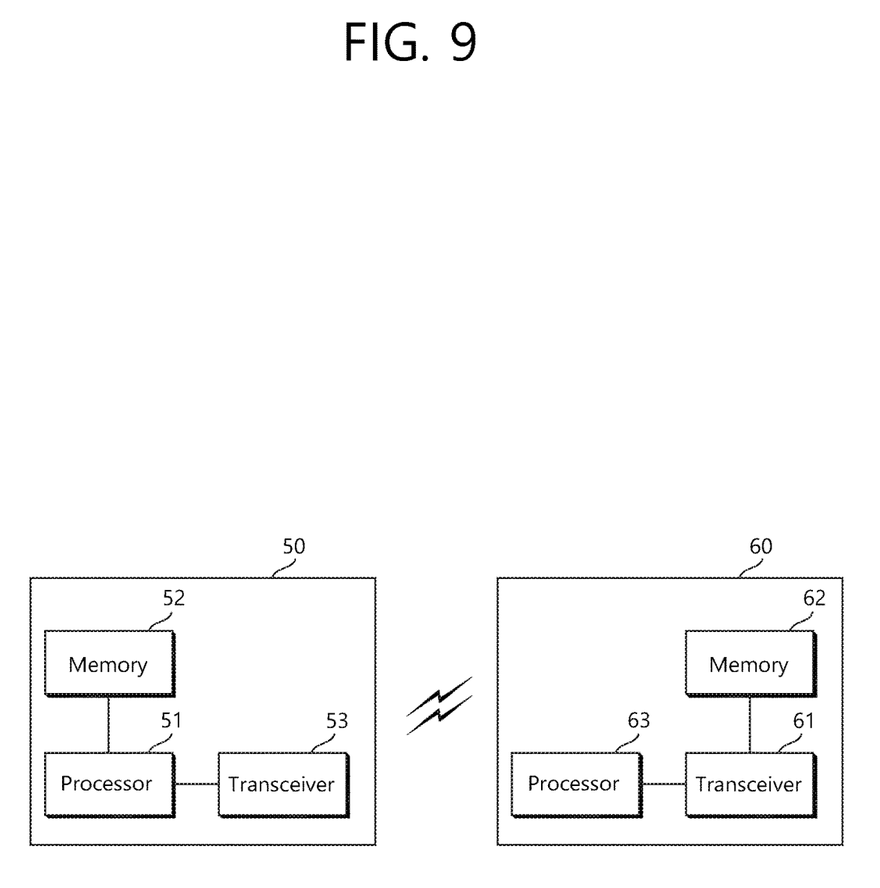
FIG. 9 is a block diagram showing a wireless communication system according to an embodiment of the present invention.

FIG. 9 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of transmitting, by a transmission node, a signal in an unlicensed band, the method comprising:
   generating a first type signal and a second type signal to be transmitted in the unlicensed band, wherein the first type signal is to be transmitted earlier than the second type signal, wherein some parts of the first type signal and the second type signal are overlapped in a specific subframe;
   performing listen before talk (LBT) for the first type signal only; and
   if a wireless medium is idle as a result of the LBT, transmitting the first type signal and the second type signal in the unlicensed band.

2. The method of claim 1, further comprising:
   receiving LBT information including a first LBT parameter and a second LBT parameter,
   wherein the first LBT parameter is used for performing the LBT for the first type signal, and
   wherein the second LBT parameter is used for performing LBT for the second type signal.

3. The method of claim 2, wherein the first LBT parameter comprises a first backoff parameter, and the second LBT parameter comprises a second backoff parameter.

4. The method of claim 2, wherein the first LBT parameter comprises a first clear channel assessment (CCA) period, and the second LBT parameter comprises a second CCA period.

5. The method of claim 2, wherein the LBT information further comprises information on a fixed LBT scheme and a random LBT scheme, wherein the fixed LBT scheme is used for performing the LBT for the first type signal, and wherein the random LBT scheme is used for performing LBT for the second type signal.

6. The method of claim 1, wherein the first type signal comprises a discovery reference signal (DRS), and the second type signal comprises a physical downlink shared channel (PDSCH).

7. The method of claim 1, wherein if a first maximum length of a first transmission burst in which the first type signal is to be transmitted is insufficient to transmit both the first type signal and the second type signal, the first type signal and the second type signal are transmitted during a second maximum length of a second transmission burst in which the second type signal is to be transmitted, a transmission for a preceding part of the first type signal that is out of the second maximum length burst is discarded, and the first type signal is transmitted in the specific subframe.

8. A device for transmitting a signal in an unlicensed band, the device comprising:

a transceiver that transmits and receives a radio signal; and a processor operatively coupled to the transceiver and configured to:

generate a first type signal and a second type signal to be transmitted in the unlicensed band, wherein the first type signal is to be transmitted earlier than the second type signal, wherein some parts of the first type signal and the second type signal are overlapped in a specific subframe;

control the transceiver to perform listen before talk (LBT) for the first type signal only; and control the transceiver to transmit the first type signal and the second type signal in the unlicensed band if a wireless medium is idle as a result of the LBT.

9. The device of claim 8, wherein the processor is configured to receive LBT information including a first LBT parameter and a second LBT parameter, wherein the first LBT parameter is used for performing the LBT for the first type signal, and wherein the second LBT parameter is used for performing LBT for the second type signal.

10. The device of claim 9, wherein the first LBT parameter comprises a first backoff parameter, and the second LBT parameter comprises a second backoff parameter.

11. The device of claim 9, wherein the first LBT parameter comprises a first clear channel assessment (CCA) period, and the second LBT parameter comprises a second CCA period.

12. The device of claim 9, wherein the LBT information further comprises information on a fixed LBT scheme and a random LBT scheme, wherein the fixed LBT scheme is used for performing the LBT for the first type signal, and wherein the random LBT scheme is used for performing LBT for the second type signal.

13. The device of claim 8, wherein the first type signal comprises a discovery reference signal (DRS), and the second type signal comprises a physical downlink shared channel (PDSCH).

14. The device of claim 8, wherein if a first maximum length of a first transmission burst in which the first type signal is to be transmitted is insufficient to transmit both the first type signal and the second type signal, the first type signal and the second type signal are transmitted during a second maximum length of a second transmission burst in which the second type signal is to be transmitted, a transmission for a preceding part of the first type signal that is out of the second maximum length burst is discarded, and the first type signal is transmitted in the specific subframe.

* * * * *